Feb. 21, 1950        C. VINTEN        2,498,188
CINEMATOGRAPH CAMERA WITH REFLECTING VIEWFINDER
Filed May 8, 1947
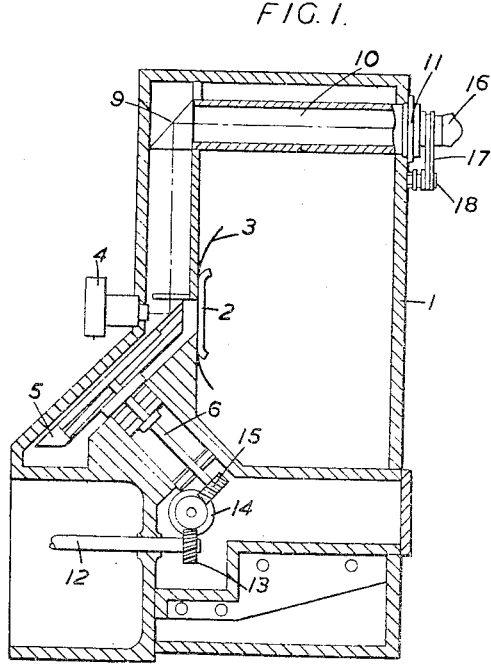
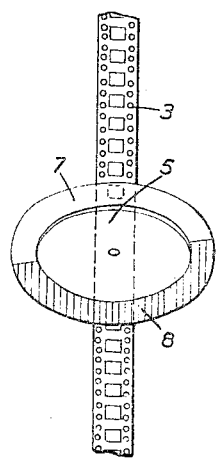
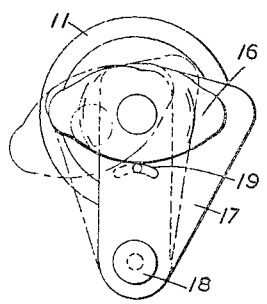
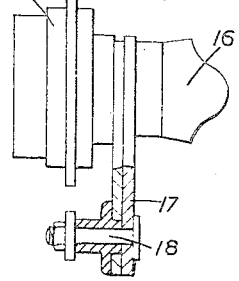
Inventor
CHARLES VINTEN
By
Attorney Patented Feb. 21, 1950

2,498,188

UNITED STATES PATENT OFFICE 2,498,188

CINEMATOGRAPH CAMERA WITH REFLECTING VIEW FINDER

Charles Vinten, London, England

Application May 8, 1947, Serial No. 746,732
In France June 16, 1939

Section 1, Public Law 690, August 8, 1946
Patent expires June 16, 1959

5 Claims. (Cl. 88—16)

The present invention relates to cinematograph cameras and refers more particularly to view finders therefor. It is desirable in cinematograph cameras to be able to observe the field of view of the camera lens while the film is actually undergoing exposure, so as to be able to follow the action, as required, with camera movement. Various methods have been proposed for permitting this, and of these the most satisfactory method is to employ the same objective lens for the view finder as is used for the exposure of the film, and this may be accomplished by using a view finder which comes into operation in the intervals of film shift between consecutive frame exposures, using for example, a reflecting surface on the front of the opaque section of the revolving camera shutter for transmitting into the view finder eye-piece the image formed by the camera lens on said reflecting surface.

Cinematograph cameras having a view finder of the above-mentioned type have been proposed in which the camera shutter, in the form of an apertured disc, rotates about an axis which is, in one case, perpendicular, and, in another case, at 45° to the plane of the film at the exposure aperture. In these known devices the light beam after passing through the camera objective is deflected, during the intervals of film shift, through an angle of 90° by reflection from the shutter, and the arrangements of the shutter driving mechanisms preclude movement of the film through the exposure gate in a direction parallel to the reflected light beam. In each case it is necessary for the film to be moved in a direction perpendicular not only to the axis of the camera objective but also to the direction of the light beam after reflection from the shutter. Thus, in these known arrangements, if the view finder is to be located at the top of the camera casing, the film is moved horizontally, or, if the direction of movement of the film is to be vertical, the view finder is located at the side of the camera casing.

One object of the invention is to overcome this limitation in the known devices, thus making it possible, for example, to locate the view finder above the camera while retaining the normal vertical movement of the film. Other objects of the invention are to provide an arrangement allowing use in the camera of objectives of short focus and wide aperture, and to reduce the size of the revolving shutter and thereby the over-all dimensions of the camera casing.

With these ends in view the invention consists in a cinematograph camera having a view finder which receives the image formed by the camera objective during the intervals of film shift, wherein during the said intervals the light beam from the camera objective is reflected, from a suitable surface on the face of a disc shutter in the camera, in a direction coplanar with the direction of movement of the film, and thereafter is transmitted through an optical system to the eye-piece of the view finder accessible from outside the camera casing.

In the preferred construction the shutter is disposed in front of the film with its plane disposed at substantially 45° to the film surface, so that its flat front surface is disposed at 45° to the axis of the objective lens, with the result that the light beam striking the reflecting portion of the front of the shutter is directed upwards, parallel to the plane of the film, to another reflecting surface by which it is directed into the viewing tube. This viewing tube located at the top of the camera case may be provided with an eye-piece, which projects at the back of the camera casing, being either embodied in the casing itself or attached externally thereto.

The invention is illustrated by the accompanying drawings, in which:

Figure 1 is a diagrammatic sectional view of a cinematograph camera with the invention applied thereto, Figure 2 is a detail view showing the relative disposition of the revolving camera shutter and the film, and Figures 3 and 4 are front and side views, respectively, to an enlarged scale, of the eye-piece fitting of the view finder device.

In the drawing 1 indicates the camera body, 2 the camera gate, and 3 the film, passing through the gate, opposite to the camera objective lens 4. The lens 4 is spaced from the film 3 in accordance with its focal length, and in the space between the lens and film runs the peripheral portion of a rotating circular shutter 5, whose plane is inclined at 45° to the surface of the film 3. The axis of the shutter 5 is coaxial with the shaft 6 on which it is mounted and by which it is driven, and said axis and shaft 6 lie in a vertical plane at right angles to the plane of the film 3. Care is taken to ensure that the inclination and disposition of the shaft 6 and its housing and bearings, as well as the dimensions of the shutter and its associated parts, are such as to allow ample clearance between these members and the gate 2 for passage of the film 3. By this means it is possible for the film to be moved in a direction substantially parallel to the deflected light beam, i. e. in a vertical direction in the arrangement shown in Figure 1. Consequently the relative disposition of the shutter 5 and film 3 are as shown in Figure 2, with the periphery of the shutter 5 cutting transversely across the width of the film 3. The film 3 may be brought almost as close to the objective lens as the height of a picture frame.

As will be seen from the drawings, the dimension of the width and height of each frame are in the ratio of approximately 4:3. The arrangement described enables the lens to be located comparatively close to the film without coming into contact with the rotating shutter, and a lens of very short focus and large aperture may therefore be used.

One peripheral section 7 of the shutter 6 is transparent so that the rays from the lens 4 can reach the light sensitive film 3, but the shutter also has a peripheral section 8 which is opaque and has a reflecting surface on its front face, remote from the film 3. The rays from the lens 4 are reflected in a direction parallel to the plane of the film, to the reflecting prism 9, and thence at right angles again into the viewing tube 10 of the view finder, which has an eye-piece 11 outside the camera body 1.

The shutter shaft 6 is driven, for example, through shaft 12, worm wheel 13, worm 14, and worm wheel 15, by the camera mechanism which also operates the film shift mechanism.

The eye-piece 11 of the viewing tube 10 comprises a rubber eye shade 16, which, when the view finder is in use, fits closely in the eye socket and effectively prevents the access of light to the film surface during exposure intervals, through the view finder device. When however, the view finder is not in use, the lens of the eye-piece 11 is covered by a plate or shutter 17 pivoted at 18, which carries the eye-shade 16 and can be swung over into two extreme positions limited by the slot 19, the eye shade 16 being in position for use in one extreme position of plate 17 and the eye-piece 11 being covered over by a solid portion of the plate 17 in the other extreme position of the plate 17.

What I claim is:

1. A cinematograph camera comprising a film gate, a lens system projecting images to be photographed on to a film in said gate, a centrally dished rotary disc shutter, inclined to the axis of said lens system, interposed between said lens system and said gate with its peripheral edge next adjacent and close to said film in said gate, a narrow part-annular area in said shutter, at and extending completely to the peripheral edge of the shutter, through which an image is projected on to the film during part of a rotational cycle of said shutter, a narrow part-annular opaque area in the edge of said dished shutter for cutting-off passage of light from said lens system to said film during another part of a rotational cycle of said shutter, a reflective surface on said opaque shutter area whereby during the whole of said cut-off time the light incident thereon from said lens system is reflected in a direction coplanar with the longitudinal centre line of the film in said gate, means for shifting the film during said cut-off time in order to bring to said gate an unexposed frame of the film, and optical means for receiving the light reflected from said opaque shutter area and providing thereby a viewing image of the scene being photographed.

2. A cinematograph camera according to claim 1 wherein the rotary disc shutter is of substantial axial thickness and its peripheral undersurface is cut away to susbtantially frusto-conical shape.

3. A cinematograph camera as claimed in claim 1 wherein the rotational axis of said shutter, the optical axis of said lens system, and the direction of movement of the film through said gate are all coplanar, and the rotational axis of said shutter is inclined to the optical axis of said lens system.

4. A cinematograph camera according to claim 1 wherein the optical axis of said lens system and the direction of movement of said film through said gate are substantially perpendicular to one another, and the rotational axis of said shutter is at substantially 45° to said optical axis.

5. A cinematograph camera according to claim 1 wherein the disc shutter extends substantially uniformly about its rotational axis thus allowing the shutter to be substantially dynamically balanced for rotation.

CHARLES VINTEN.

REFERENCES CITED

The following references are of record in the file of this patent:

UNITED STATES PATENTS

| Number | Name | Date |
|---|---|---|
| 1,275,249 | Hlavaty | Aug. 13, 1918 |
| 1,353,191 | Thomas | Sept. 21, 1920 |
| 1,792,436 | Mery | Feb. 10, 1931 |
| 1,794,499 | Rosenberger | Mar. 3, 1931 |
| 1,872,404 | Case | Aug. 16, 1932 |
| 2,012,352 | Rusting et al. | Aug. 27, 1935 |

FOREIGN PATENTS

| Number | Country | Date |
|---|---|---|
| 275,404 | Germany | June 17, 1914 |
| 145,861 | Great Britain | June 30, 1920 |
| 746,784 | France | Mar. 14, 1933 |
| 90,485 | Austria | Dec. 27, 1922 |